United States Patent [19]

Yanagawa et al.

[11] Patent Number: 5,539,721
[45] Date of Patent: Jul. 23, 1996

[54] REDUCING THE RECORDING POWER BASED ON THE TIMING OF RECORDED SYNCHRONIZATION SIGNAL

[75] Inventors: Naoharu Yanagawa; Shinichi Okada, both of Tokorozawa, Japan

[73] Assignee: Pioneer Electronic Corporation, Tokyo, Japan

[21] Appl. No.: 236,739

[22] Filed: May 2, 1994

[30] Foreign Application Priority Data

May 6, 1993 [JP] Japan .................................. 5-105712

[51] Int. Cl.$^6$ .............................. G11B 7/00; H04N 5/76
[52] U.S. Cl. ...................... 369/116; 369/124; 369/275.1; 369/275.4; 358/340; 358/342
[58] Field of Search ............................... 369/116, 275.1, 369/275.4, 124; 358/335, 342, 310, 340; 360/37.1, 33.1

[56] References Cited

U.S. PATENT DOCUMENTS

| | | | |
|---|---|---|---|
| 4,499,502 | 2/1985 | Dakin et al. ............................ | 358/310 |
| 4,761,694 | 8/1988 | Shudo et al. ............................ | 360/37.1 |
| 4,897,827 | 1/1990 | Raetzer et al. ........................... | 358/342 |
| 5,151,793 | 9/1992 | Ito et al. .................................. | 358/335 |
| 5,289,453 | 2/1994 | Ohno et al. .............................. | 369/116 |

Primary Examiner—Georgia Y. Epps
Assistant Examiner—Kim-Kwok Chu
Attorney, Agent, or Firm—Young & Thompson

[57] ABSTRACT

A method of recording an optical disk, by irradiating a laser light onto a predetermined track of the optical disc to record information pits corresponding to an input composite signal including data signal and synchronization signal, includes the steps of: detecting a record timing of the synchronization signal to be recorded; and reducing at least one of a recording power and a recording duty of the laser light when the information pit corresponding to the synchronization signal is recorded by the laser light, according to the detected record timing.

14 Claims, 7 Drawing Sheets

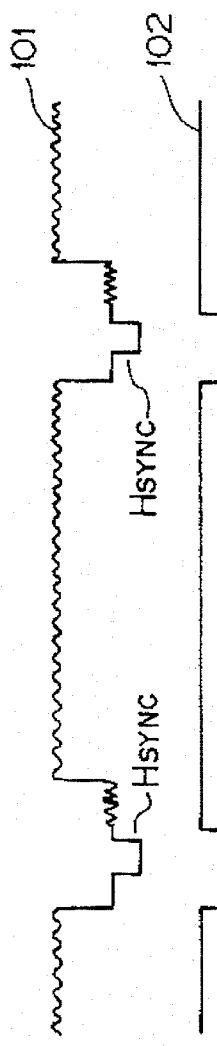
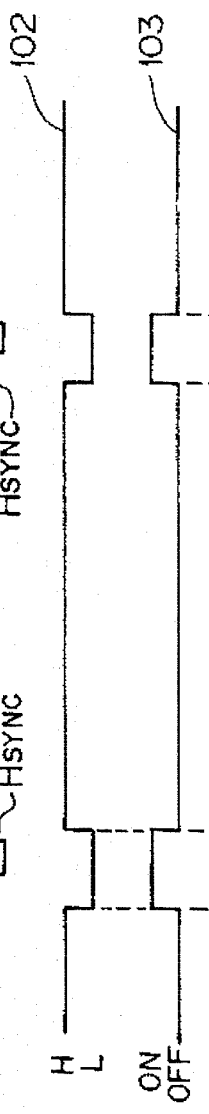
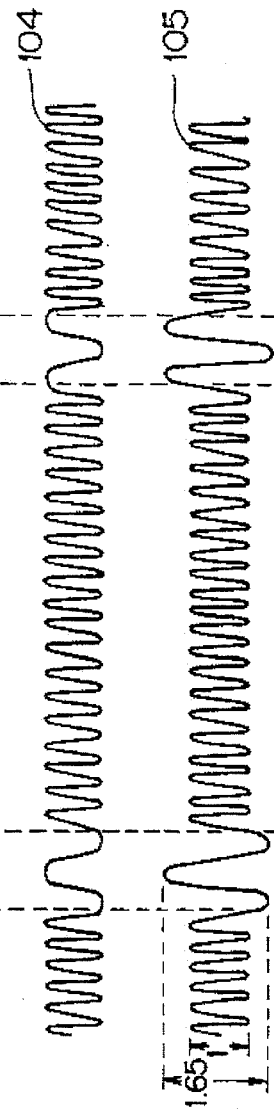
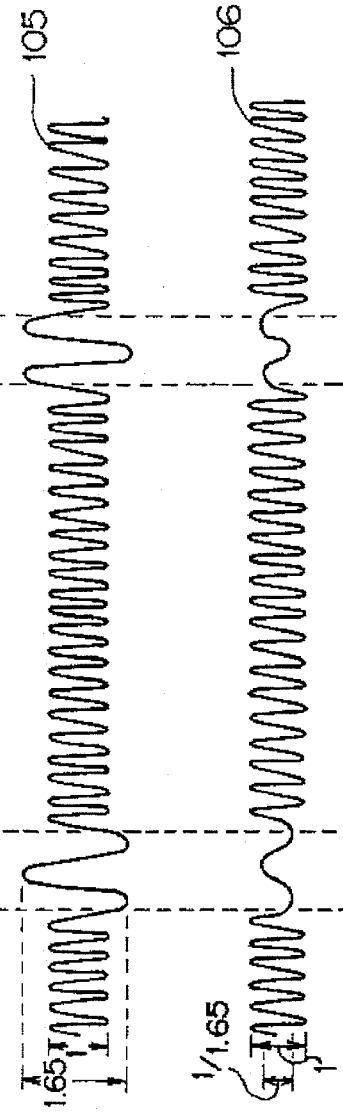
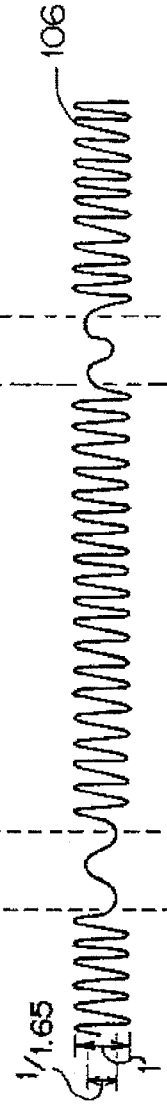
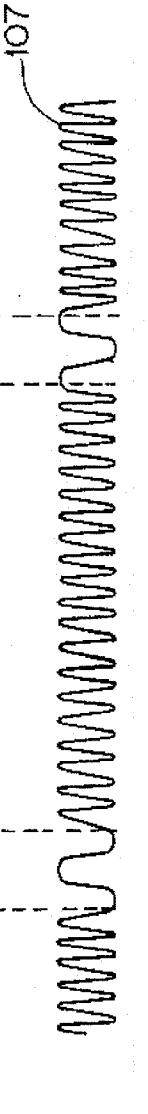
FIG. 3A VIDEO SIGNAL CD
FIG. 3B GATE SIGNAL SgH
FIG. 3C SWITCH SW
FIG. 3D FM SIGNAL FOR LASER DIODE (COMPARISON EXAMPLE)
FIG. 3E DEMODULATED WAVEFORM (COMPARISON EXAMPLE)
FIG. 3F FM SIGNAL FOR LASER DIODE (PRESENT INVENTION)
FIG. 3G DEMODULATED WAVEFORM (PRESENT INVENTION)

REDUCING THE RECORDING POWER BASED ON THE TIMING OF RECORDED SYNCHRONIZATION SIGNAL

BACKGROUND OF THE INVENTION

1. Field of the Invention

The present invention generally relates to a method of recording an optical disk and an apparatus for recording an optical disk, and more particularly, it relates to a method of recording an optical disk and an apparatus for recording an optical disk, which can reduce a crosstalk from adjacent record tracks.

2. Description of the Related Art

As an optical disk, to and from which information can be freely recorded and reproduced by a user, there are a write once type optical disk of metal pigment film type, a rewritable type magneto-optic disk, a phase changing type optical disk and so on.

FIG. 5 shows a record signal spectrum of a LDD (Laser vision Disk with Digital audio).

For example, if whole display screen is occupied by white signals (i.e. white level signals), the signals of the appeared portion of the display screen are modulated to 9.3 MHz, while the horizontal synchronization signal and the vertical synchronization signal at the portion outside of the display screen are modulated to 7.6 MHz.

FIG. 6 shows an optical MTF (Modulation Transfer Function) characteristic at the innermost portion of the disk of LDD type (linear velocity is 10 m/sec).

This MTF characteristic is shown such that the recording frequency (pit size) of the data recorded on the disk of LDD type, is set to the axis of abscissa and the signal amplitude at the time of reproducing the disk by an optical pickup for a LD (Numerical Aperture NA=0.53, wavelength $\lambda$=780 nm), is set to the axis of ordinate. From this, it is understood that the signal amplitude of the synchronization signal (7.6 MHz) is about 1.65 times of that of the white signal (9.3 MHz).

Therefore, as shown in FIG. 7, the size of the record pit on a track $TR_2$ for the synchronization signal of the optical disk also becomes about 1.65 times of that on a track $TR_1$ (or $TR_3$) for the white signal correspondingly. Thus, there arises a possibility that a crosstalk is generated because the reading light beam, which is reading the white signal on the record track $TR_1$ (or $TR_3$), also reads the pit information corresponding to the synchronization signal on the record track $TR_2$, which is adjacent to the record track $TR_1$ (or $TR_3$). Especially, in case of reproducing an optical disk of CLV (Constant Linear Velocity) type, since there is a high possibility that the video signal such as a white signal is recorded on one record track adjacent to another record track on which the synchronization signal is recorded, the crosstalk may be considerably generated.

More concretely, when the crosstalk is generated due to the synchronization signal, the portion where the crosstalk is Generated, becomes a color different from the desirable color to be displayed (white) on a displayed image, so that the image is degraded in quality as shown in FIG. 8, which is a serious problem.

SUMMARY OF THE INVENTION

It is therefore an object of the present invention to provide a method of recording the optical disk and an apparatus for recording the optical disk, which can prevent the crosstalk due to the size of the record pit of the synchronization signal, and perform an image reproduction of high quality.

The above object of the present invention can be achieved by a method of recording an optical disk, by irradiating a laser light onto a predetermined track of the optical disc to record information pits corresponding to an input composite signal including data signal and synchronization signal. The method includes the steps of: detecting a record timing of the synchronization signal to be recorded; and reducing at least one of a recording power and a recording duty of the laser light when the information pit corresponding to the synchronization signal is recorded by the laser light, according to the detected record timing.

According to the recording method of the present invention, firstly, the actual record timing of the synchronization signal to be recorded, is detected. Then, the information pit corresponding to the synchronization signal is recorded under a condition where at least one of the recording power and the recording duty of the laser light is reduced, when the record information corresponding to the synchronization signal is recorded, according to the detected synchronization signal.

Therefore, the size of the information pit corresponding to the synchronization signal can be reduced, so that the crosstalk to the adjacent record track due to this information pit can be reduced.

In one aspect of the method of the present invention, it is preferable that the recording power of the laser light is reduced such that an information pit corresponding to the data signal and an information pit corresponding to the synchronization signal have substantially the same size to each other. Therefore, the reproduction operation for the information pit of the data signal and the information pit of the synchronization signal can be easily and reliably performed in the same manner without causing the crosstalk.

In another aspect of the present invention, it is preferable that the method further includes the step of delaying the input composite signal. The laser light is irradiated to record the information pits corresponding to the delayed input composite signal. In the detecting step, the record timing is detected by separating the synchronization signal from the input composite signal before the delaying step. Therefore, the detection of the record timing of the synchronization signal can be achieved in advance of recording the pertinent synchronization signal, so that the reduction of the laser power can be easily and reliably performed.

The above object of the present invention can be also achieved by an apparatus for recording an optical disk, provided with: an irradiating device for irradiating a laser light onto a predetermined track of the optical disc to record information pits corresponding to an input composite signal including data signal and synchronization signal; a detection device for detecting a record timing of the synchronization signal to be recorded, and outputting record timing detection signal; and a control device for reducing at least one of a recording power and a recording duty of the laser light when the information pit corresponding to the synchronization signal is recorded by the laser light, according to the record timing detection signal.

According to the recording apparatus of the present invention, the detection device detects the actual record timing of recording the synchronization signal to the optical disk, and outputs the record timing detection signal to the control device.

Then, the control device controls the irradiating device to record the information pit with reducing at least one of the recording power and the recording duty of the laser light at the actual record timing of the synchronization signal, according to the record timing detection signal.

Therefore, the size of the information pit corresponding to the synchronization signal can be reduced, so that the crosstalk to the adjacent record track due to this information pit can be reduced.

In one aspect of the present invention, it is preferable that the control device reduces the recording power of the laser light such that an information pit corresponding to the data signal and an information pit corresponding to the synchronization signal have substantially the same size to each other. Therefore, the reproduction operation for the information pit of the data signal and the information pit of the synchronization signal can be easily and reliably performed in the same manner without causing the crosstalk.

In another aspect of the present invention, it is preferable that the apparatus is further provided with a delaying device for delaying the input composite signal. The irradiating device irradiates the laser light to record the information pits corresponding to the delayed input composite signal. The detection device detects the record timing by separating the synchronization signal from the input composite signal before delaying the input composite signal. Therefore, the detection of the record timing of the synchronization signal can be achieved in advance of recording the pertinent synchronization signal, so that the reduction of the laser power can be easily and reliably performed.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3(a)–3(g) are charts for showing operations of an embodiment and a comparison example;

DETAILED DESCRIPTION OF THE PREFERRED EMBODIMENTS

Referring to the accompanying drawings, an embodiment of the present invention will be now explained.

Figure 1:
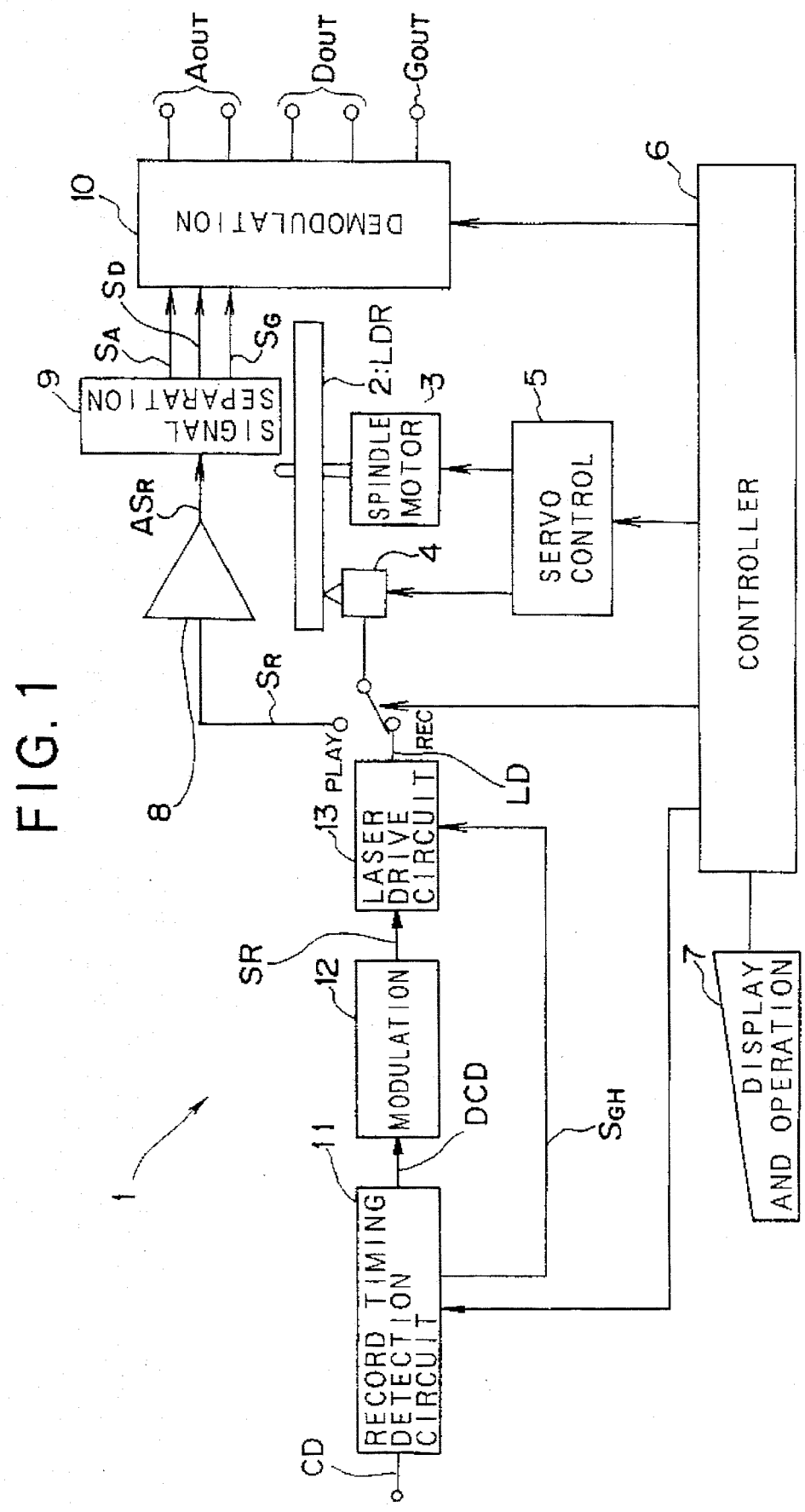
FIG. 1 is a block diagram for showing an outline construction of a LDR recording and reproducing apparatus.

FIG. 1 shows an outline construction of a LDR (Recordable Laser vision Disk) recording and reproducing apparatus as an embodiment of the present invention.

In FIG. 1, a LDR recording and reproducing apparatus 1 is provided with: a spindle motor 3 for rotating and driving a LDR 2 as one example of an optical disk; an optical pickup unit 4 for writing and reading information to and from the LDR 2; a reproducing system for performing a reproduction of the record information, which is recorded on the LDR 2; a recording system for recording information onto the LDR 2; a servo control unit 5 for performing a tracking servo and a focusing servo; a controller 6 for performing the overall control of the LDR recording and reproducing apparatus 1; and a display and operation unit 7 for performing a display of various data and an input operation of various data.

Figure 5:
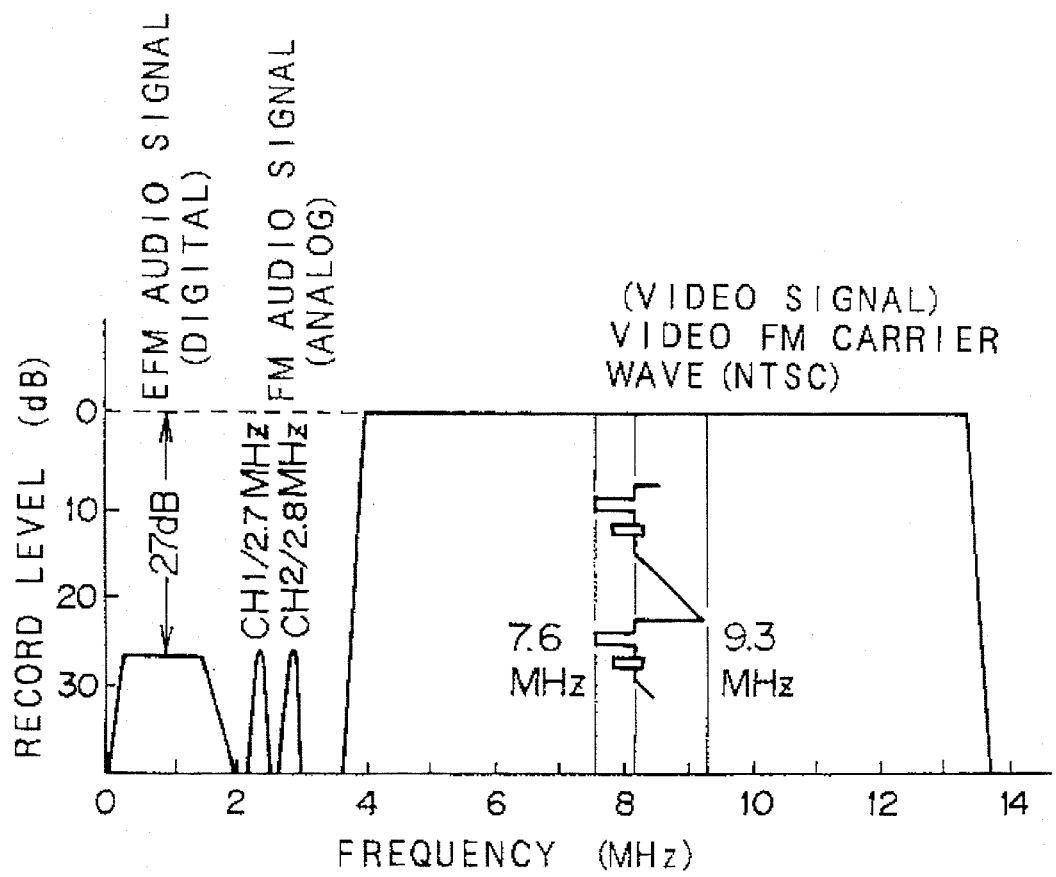
FIG. 5 is a diagram for explaining a record signal spectrum of a LDD.
Figure 6:
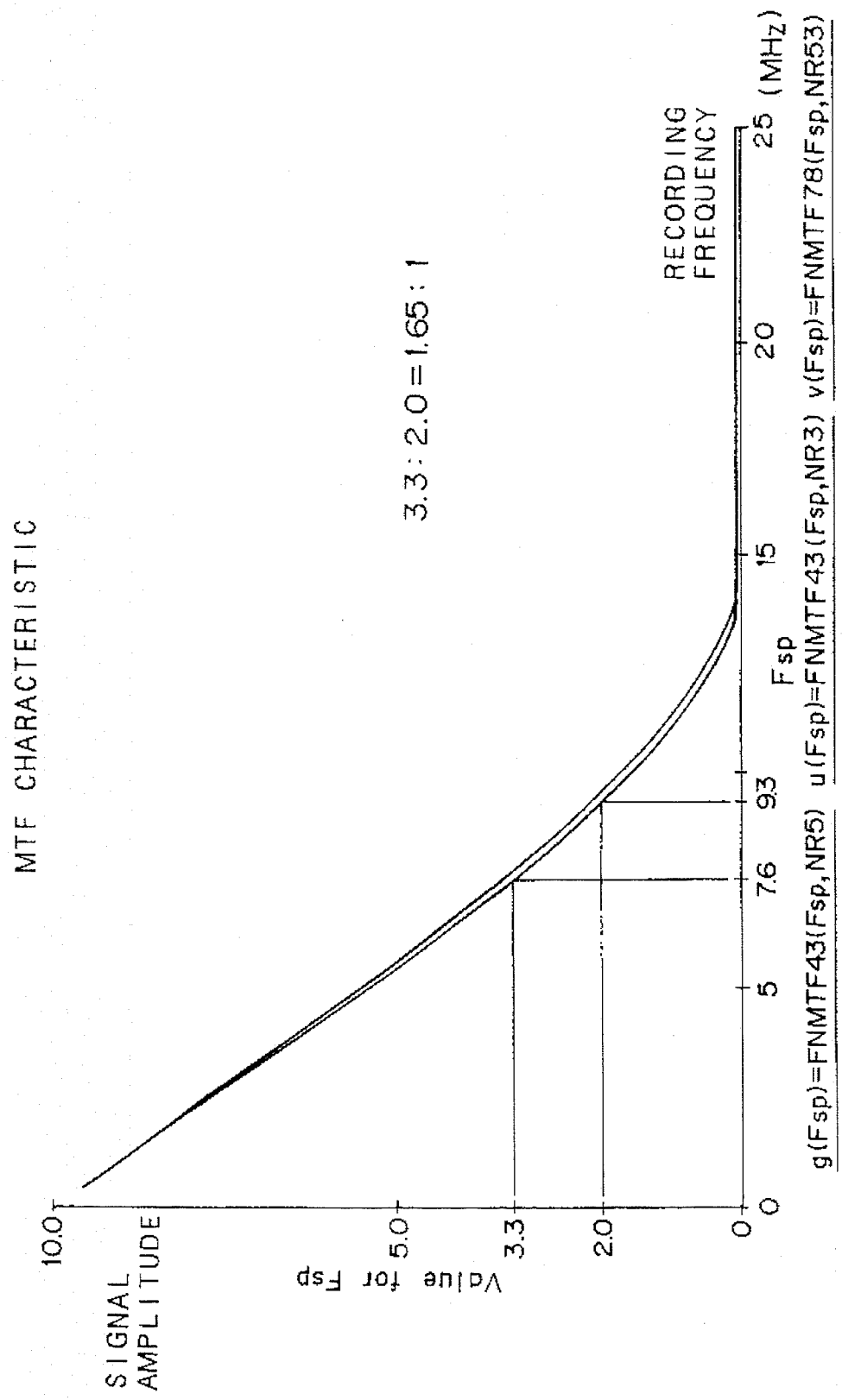
FIG. 6 is a graph for explaining a MTF characteristic at the innermost circumference of the LDD.
Figure 7:
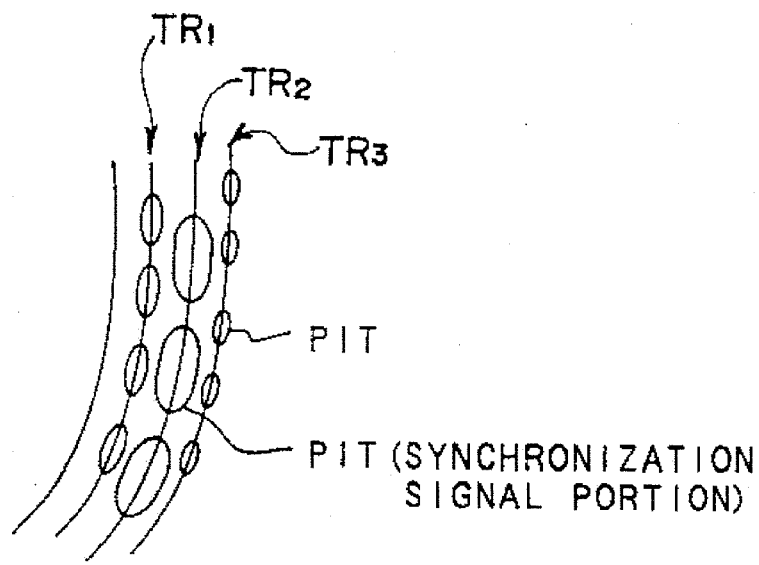
FIG. 7 is a diagram for explaining the problem in the related art.
Figure 8:
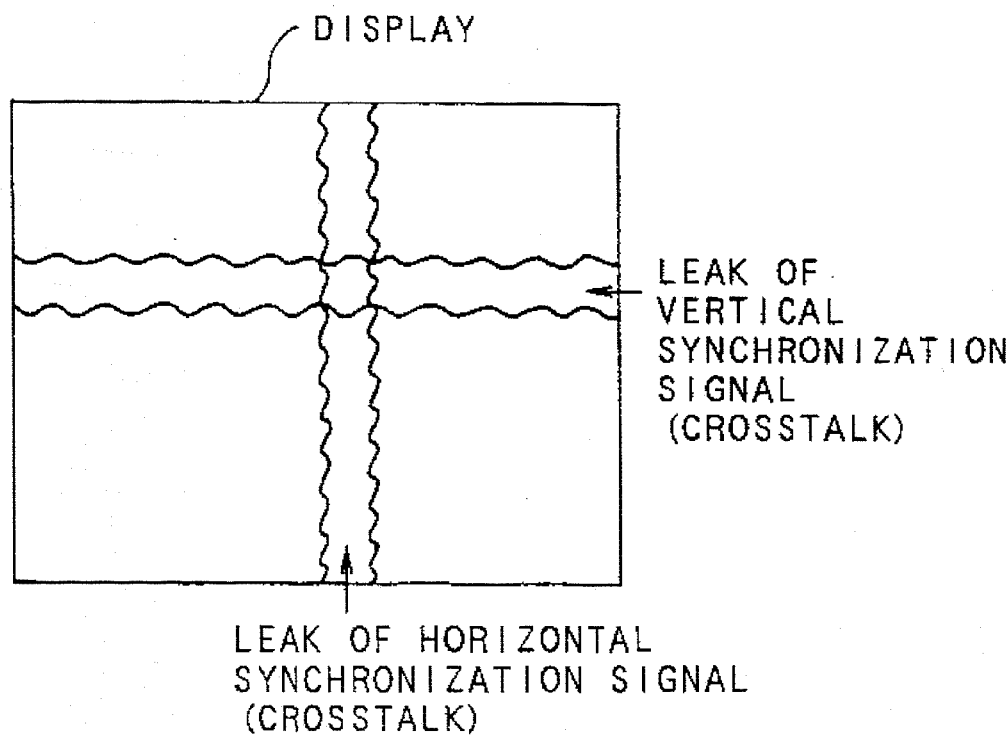
FIG. 8 is another diagram for explaining the problem in the related art.

The reproducing system of the LDR recording and reproducing apparatus 1 is provided with: a reproduction amplifier 8 for amplifying a read signal Sr outputted from the pickup unit 4 to output a reproduction amplified signal $AS_R$; a signal separation unit 9 for filtering the reproduction amplified signal $AS_R$ by a band pass filter having a band from 2.3 MHz to 2.8 MHz, to output an analog audio band signal $S_A$, filtering the reproduction amplified signal $AS_R$ by a low pass filter of 1.75 MHz to output a digital audio band signal $S_D$, and filtering the reproduction amplified signal $AS_R$ by a high pass filter of 3.5 MHz to output a video band signal $S_G$ to output a record signal having such a record signal spectrum shown in FIG. 5; and a demodulation unit 10 for demodulating the analog audio band signal $S_A$, the digital audio band signal $S_D$ and the video band signal $S_G$, which are outputted from the signal separation unit 9, to output an analog audio signal Aout, a digital audio signal Dout and a video signal Gout respectively.

The recording system of the LDR recording and reproducing apparatus 1 is provided with: a record timing detection circuit 11 for separating a horizontal synchronization signal (Hsync) from a composite video signal CD, outputting a horizontal synchronization gate signal $S_{GH}$ on the basis of the separated horizontal synchronization signal, and delaying the composite video signal CD by one horizontal synchronization period to output a delay composite video signal DCD; a modulation unit 12 for FM-modulating the delay composite video signal DCD outputted from the record timing detection circuit 11 to output a record modulation signal SR; and a laser drive circuit 13 is adapted to temporarily reduce the recording laser power at the timing when the horizontal synchronization gate signal $S_{GH}$ is at a "L" level i.e. when the horizontal synchronization signal is to be recorded, and outputting a laser drive signal LD corresponding to the record modulation signal $S_R$.

Figure 2:
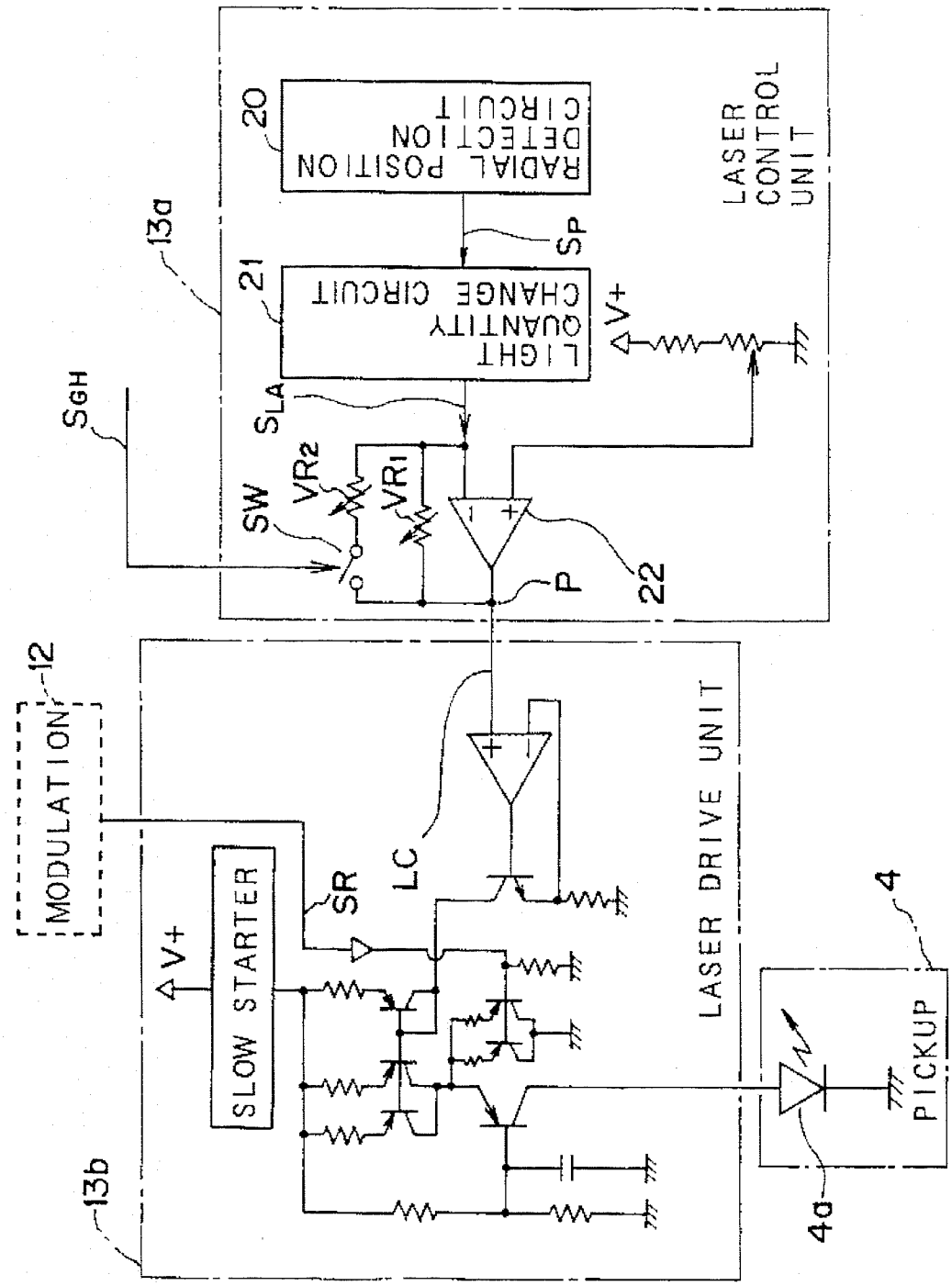
FIG. 2 is a block diagram for showing a detailed construction of a laser drive circuit.

Here, with referring to FIG. 2, the construction of the main portion of the laser drive circuit 13, is explained.

In FIG. 2, the laser drive circuit 13 is provided with: a laser control unit 13a for outputting a laser control signal LC, which is a voltage signal to control the laser output power; and a laser drive unit 13b for driving a laser diode 4a of the pickup 4 by performing a voltage/current conversion on the basis of the laser control signal LC from the laser control unit 13a and the record modulation signal $S_R$ from the modulation unit 12, to record the information.

The laser control unit 13a is provided with: a radial position detection circuit 20 for detecting a radial position of the recording position to output a position signal Sp; a light quantity change circuit 21 for outputting a light quantity setting signal $S_{LA}$ to change a laser light quantity irradiated from the laser diode 4a on the basis of the position signal Sp; an operation amplifier 22 for amplifying the light quantity setting signal $S_{LA}$ by an amplification factor corresponding to a first feed back variable resistor $VR_1$ to output a laser control signal LC; and a switch SW for turning ON/OFF by the horizontal synchronization gate signal $S_{GH}$ from the record timing detection circuit 11, and reducing the amplification factor of the operation amplifier 22 by connecting a second feed back variable resistor $VR_2$.

Nextly, the operation of the present embodiment at the time of recording will be explained with referring to FIG. 1 and FIG. 3. In this case, the LDR 2 is assumed to be an optical disk of CAV (Constant Angular Velocity) type.

When an indication of the recording operation is inputted from the display and operation unit 7, the controller 6 controls the record timing detection circuit 11 to separate the synchronization signal Hsync from the composite video signal CD (indicate by a chart line 101 of FIG. 3), and output the horizontal synchronization gate signal $S_{GH}$ (indicated by a chart line 102 of FIG. 3) on the basis of the separated horizontal synchronization signal Hsync, to the laser drive circuit 13 at the record timing of the record modulation signal $S_R$ corresponding to the horizontal synchronization signal Hsync. Further, the record timing detection circuit 11 delays the composite video signal CD by just one horizontal synchronization period, to output it as the delay composite video signal DCD to the demodulation unit 12.

The modulation unit 12 FM-modulates the delay composite video signal DCD from the record timing detection circuit 11, to output it as the record modulation signal $S_R$ to the laser drive circuit 13.

On the other hand, the radial position detection circuit 20 of the laser control unit 13a, detects the radial position of the recording position on the LDR 2, and outputs the position signal Sp to the light quantity change circuit 21.

The light quantity change circuit 21 outputs the light quantity setting signal $S_{LA}$ to the inverted input terminal of the operation amplifier 22, on the basis of the position signal Sp from the radial position detection circuit 20. This light quantity setting signal $S_{LA}$ is a signal to reduce the laser light quantity at the inner circumferential side, where the linear velocity is low, and to increase the laser light quantity at the outer circumferential side of the disk, where the linear velocity is high.

Here, if the horizontal synchronization gate signal $S_{GH}$ is at the "H" level, since the switch SW is in the open state (as indicated by the chart line 103 of FIG. 3), the operation amplifier 22 amplifies the light quantity setting signal $S_{LA}$ by an amplification factor α1, which corresponds to the first feed back variable resistor $VR_1$, and output the amplified signal to the laser drive unit 13b.

On the other hand, if the horizontal synchronization gate signal $S_{GH}$ is at the "L" level, since the switch SW is in the close state (as indicated by the chart line 103 of FIG. 3), the operation amplifier 22 amplifies the light quantity setting signal $S_{LA}$ by an amplification factor α2 (α2<α1), which corresponds to the composite feed back resistor value in case of connecting the first feed back variable resistor $VR_1$ and the second feed back variable resistor $VR_2$ in parallel, and outputs the amplified signal to the laser drive unit 13b.

Therefore, the ratio of the output voltage V2 at the point P, when the switch SW is in the close state, and the output voltage V1 at the point P, when the switch SW is in the open state, is expressed by a following expression (1).

$$V2/V1 = \alpha2/\alpha1 < 1 \quad (1)$$

The laser output LP2 when the switch SW is in the close state, can be expressed by use of the laser output LP1 when the switch SW is in the open state, by a following expression (2).

$$LP2 = (\alpha2/\alpha1) \times LP1 \quad (2)$$

As a result, in the present example, by determining the ratio of the amplification factor as $$\alpha2/\alpha1 = 1/1.65,$$

the laser drive unit 13b performs recording with reducing the laser power to be about 1/1.65 times of that in the case of the video signal recording (i.e. setting the amplitude of the FM modulation signal to be 1/1.65 times as indicated by a chart line 106), while the horizontal synchronization gate signal $S_{GH}$ at the "L" level is being inputted to the laser control unit 13a, namely, while it is recording the horizontal synchronization signal on the LDD. Thus, the size of the record pit corresponding to the horizontal synchronization signal can be substantially the same as that of the record pit corresponding to the video signal, since the size of the record pit is proportional to the amplitude of the reproduced waveform as indicated by the chart line 107 of FIG. 3.

In FIG. 3, the FM signal to drive the laser diode of a comparison example, is also indicated by a chart line 104, while the demodulated waveform of the comparison example, is indicated by a chart line 105.

By comparing those, it is understood that the size of the pit of the horizontal synchronization signal is different from that of the video signal because the FM signal to drive the laser diode has the constant amplitude throughout the video signal and the synchronization signal in the comparison example, which is based on the conventional technology. On the contrary, because the FM signal to drive the laser diode is reduced in accordance with the MTF characteristic, the size of the pit of the horizontal synchronization signal is substantially the same as that of the video signal in the present embodiment.

In this manner, the crosstalk due to the record pit corresponding to the horizontal synchronization signal, can be diminished.

As explained above in detail, according to the present embodiment, the crosstalk to adjacent record tracks due to the record pit corresponding to the horizontal synchronization signal, can be diminished, and the high quality image display can be achieved.

In the above explanation, although the horizontal synchronization signal is recorded, the procedure can be applied to the vertical synchronization signal in the same manner, so that the crosstalk to the adjacent record tracks due to the record pit corresponding to the vertical synchronization signal, can be also diminished, and even higher quality image display can be achieved.

Nextly, a second embodiment of the present invention will be explained with referring to FIG. 1 and FIG. 4.

In the above mentioned first embodiment, the laser power is changed. However, just by reducing the laser power, the duty of the formed pits may be destroyed. The second embodiment is adapted to change the recording duty if the duty of the formed pits is destroyed by reducing the laser power.

In the second embodiment, the recording duty is changed by use of the multi-pulse method, which is known and available as a method to prevent a tear shaped pit due to the heat accumulation, in the field of digital recording.

Figure 4:
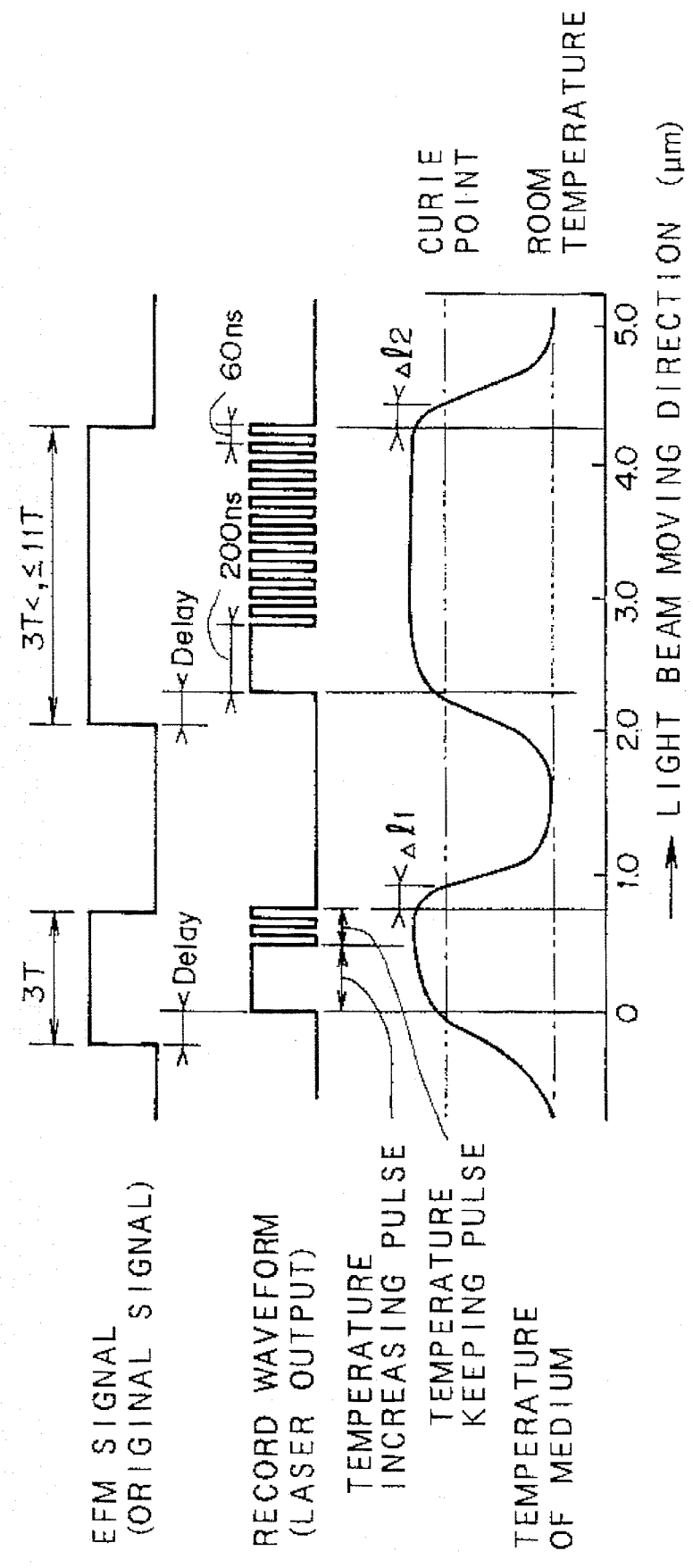
FIG. 4 is a chart for explaining a multi-pulse method in the embodiment.

In the multi-pulse method, as shown in FIG. 4, a temperature increasing pulse, which has a wide pulse width, is irradiated to increase the temperature of the pertinent recording position, at the beginning of forming the pit, and after that, as the remaining heat due to the temperature increasing pulse is utilized, a plurality of temperature keeping pulses, each of which has a small pulse width and which total number corresponds to the pit length to be formed, is irradiated to form a pit.

Although the second embodiment has the same construction as shown in FIG. 1, in the second embodiment, the laser drive circuit 13 and the laser diode in the optical pickup 4 are constructed to generate the record waveform (laser output) including the temperature increasing pulse and the temperature keeping pulse from the EFM signal (original signal) as shown in FIG. 4, and drives the laser diode of the optical pickup 4 to emit a multi-pulse laser light.

By recording the synchronization signal portion by use of this multi-pulse method, the recording duty can be changed without changing the duty of the pit.

Further, in the above explained embodiments, the CAV disk is explained. However, the present invention is not limited to the CAV disk, but can be adapted to the CLV disk etc. in the same manner.

According to the present embodiment, the actual record timing of the synchronization signal to be recorded, is detected. Then, the information pit corresponding to the synchronization signal is recorded under a condition where at least one of the recording power of the laser light and the recording duty is reduced on the basis of the detected record timing, while the record information corresponding to the synchronization signal is recorded.

Therefore, the size of the information pit corresponding to the synchronization signal can be reduced, so that the crosstalk to the adjacent record track due to this information pit can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording an optical disc, by irradiating a laser light onto a predetermined track of the optical disc to record information pits corresponding to an input video composite signal including video data signal and frame synchronization signal, said method comprising the steps of:

detecting a time duration of the frame synchronization signal to be recorded;

recording the video data signal in form of the information pits on the predetermined track;

recording the frame synchronization signal in form of the information pits on the predetermined track such that at least one information pit corresponding to the frame synchronization signal on one turn of the predetermined track is located adjacent to another information pit corresponding to the video data signal on another turn of the predetermined track adjacent to said one turn of the predetermined track; and reducing at least one of a recording power and a recording duty cycle of the laser light for recording the frame synchronization signal to reduce cross talk when the information pit corresponding to the frame synchronization signal is recorded by the laser light, according to the detected time duration.

2. A method according to claim 1, wherein the recording power of the laser light is reduced such that an information pit corresponding to the video data signal and an information pit corresponding to the frame synchronization signal have substantially the same size to each other.

3. A method according to claim 1, further comprising the step of delaying the input video composite signal, said laser light being irradiated to record the information pits corresponding to the delayed input video composite signal, wherein in the detecting step, the time duration is detected by separating the frame synchronization signal from the input video composite signal before the delaying step.

4. A method according to claim 1, wherein the frame synchronization signal comprises at least one of a horizontal synchronization signal and a vertical synchronization signal.

5. A method according to claim 1, wherein, in the reducing step, the recording duty cycle is reduced by irradiating, as the laser light, a temperature increasing pulse which has a wide pulse width at a beginning of recording the information pit, and a plurality of temperature keeping pulses following the temperature increasing pulse, each of which has a small pit width and which total number corresponds to a pit length to be recorded.

6. A method according to claim 1, wherein the optical disc is CAV (Constant Angular Velocity) type, and said method further comprises the steps of:

reducing the recording power at an inner circumferential side of said optical disk, where a linear velocity of the optical disk is low; and increasing the recording power at an outer circumferential side of the disk, where the linear velocity is high.

7. An apparatus for recording an optical disc, comprising:

an irradiating means for irradiating a laser light onto a predetermined track of the optical disc to record information pits corresponding to an input video composite signal including video data signal and frame synchronization signal, the video data signal being recorded in form of the information pits on the predetermined track, the frame synchronization signal being recorded in form of the information pits on the predetermined track such that at least one information pit corresponding to the frame synchronization signal on one turn of the predetermined track is located adjacent to another information pit corresponding to the video data signal on another turn of the predetermined track adjacent to said one turn of the predetermined track;

a detection means for detecting a time duration of the frame synchronization signal to be recorded, and outputting record timing detection signal indicating the detected time duration; and a control means for reducing at least one of a recording power and a recording duty cycle of the laser light for recording the frame synchronization signal to reduce cross talk when the information pit corresponding to the frame synchronization signal is recorded by the laser light, according to the record timing detection signal.

8. An apparatus according to claim 7, wherein the control means reduces the recording power of the laser light such that an information pit corresponding to the video data signal and an information pit corresponding to the frame synchronization signal have substantially the same size to each other.

9. An apparatus according to claim 7, further comprising a delaying means for delaying the input video composite signal, said irradiating means irradiating the laser light to record the information pits corresponding to the delayed input video composite signal, said detection means detecting the time duration by separating the frame synchronization signal from the input video composite signal before delaying the input video composite signal.

10. An apparatus according to claim 7, wherein the detection means detects a time duration of at least one of a horizontal synchronization signal and a vertical synchronization signal as the frame synchronization signal.

11. An apparatus according to claim 7, wherein said control means reduces the recording duty cycle by controlling the irradiating means to irradiate, as the laser light, a temperature increasing pulse which has a wide pulse width at a beginning of recording the information pit, and a plurality of temperature keeping pulses following the temperature increasing pulse, each of which has a small pit width and which total number corresponds to a pit length to be recorded.

12. An apparatus according to claim 7, wherein the optical disc is CAV (Constant Angular Velocity) type, and said apparatus further comprises a radial position detecting means for detecting a radial position of a recording position of said optical disk, and said control means reduces the recording power at an inner circumferential side of said optical disk, where a linear velocity of the optical disk is low, and increases the recording power at an outer circumferential side of the disk, where the linear velocity is high.

13. An apparatus according to claim 7, wherein said control means comprises an operation amplifier for amplifying the laser power; and a switching means for switching an amplification factor of the operation amplifier to reduce the recording power, according to the record timing detection signal.

14. An apparatus according to claim 7, further comprising a reproducing device for performing a reproduction of the information pit recorded on said optical disc.

* * * * *